(12) United States Patent
Jewell

(10) Patent No.: US 9,753,169 B2
(45) Date of Patent: Sep. 5, 2017

(54) DELIVERY AND RECOVERY APPARATUS, METHOD, AND APPLICATIONS

(71) Applicant: FAIRFIELD INDUSTRIES INCORPORATED, Sugar Land, TX (US)

(72) Inventor: Stephen W. Jewell, Alvin, TX (US)

(73) Assignee: FAIRFIELD INDUSTRIES INCORPORATED, Sugar Land, TX (US)

( * ) Notice: Subject to any disclaimer, the term of this patent is extended or adjusted under 35 U.S.C. 154(b) by 37 days.

(21) Appl. No.: 14/652,262

(22) PCT Filed: Dec. 10, 2013

(86) PCT No.: PCT/US2013/074027
§ 371 (c)(1),
(2) Date: Jun. 15, 2015

(87) PCT Pub. No.: WO2014/093292
PCT Pub. Date: Jun. 19, 2014

(65) Prior Publication Data
US 2016/0195627 A1    Jul. 7, 2016

Related U.S. Application Data

(60) Provisional application No. 61/736,803, filed on Dec. 13, 2012.

(51) Int. Cl.
| | |
|---|---|
| *B63B 27/18* | (2006.01) |
| *G01V 1/38* | (2006.01) |
| *B63B 27/00* | (2006.01) |
| *B63C 11/52* | (2006.01) |
| *B63B 27/30* | (2006.01) |
| *B63G 8/00* | (2006.01) |
| *B63B 27/16* | (2006.01) |

(52) U.S. Cl.
CPC ............ *G01V 1/3852* (2013.01); *B63B 27/18* (2013.01); *B63B 27/30* (2013.01); *B63C 11/52* (2013.01);
(Continued)

(58) Field of Classification Search
CPC ......... B63B 35/00; B63B 35/03; B63B 35/04; B63B 27/00; B63B 27/08; B63B 27/18;
(Continued)

(56) References Cited

U.S. PATENT DOCUMENTS

| | | | | |
|---|---|---|---|---|
| 3,848,226 A | * | 11/1974 | Perez ........................ | B63C 7/26 294/66.1 |
| 6,024,344 A | | 2/2000 | Buckley et al. | |

(Continued)

FOREIGN PATENT DOCUMENTS

GB        2470784 A    12/2010

OTHER PUBLICATIONS

International Search Report and Written Opinion for International Application No. PCT/US13/74027; International Filing Date Dec. 10, 2013, pp. 1-11.

*Primary Examiner* — Frederick L Lagman
*Assistant Examiner* — Stacy Warren
(74) *Attorney, Agent, or Firm* — Bond, Schoeneck & King, PLLC; William Greener

(57) ABSTRACT

Machinery and methods are described whereby a free flying, remotely operated vehicle (ROV) can safely capture and take on board lightly managed seismic sensor devices (payload) while they are in-transit via a surface vessel in a (deep) water column. ROV payload can be replenished without the need for the ROV to return to the surface vessel to receive additional payload and to do so without the need for heavy launch and recovery machinery. The reverse process of returning payload from the ROV to the surface vessel is also disclosed.

12 Claims, 26 Drawing Sheets

(52) U.S. Cl.
CPC .. *B63B 2027/165* (2013.01); *B63G 2008/007* (2013.01)

(58) Field of Classification Search
CPC ......... B63B 27/30; B63B 27/32; B63B 21/00; B63B 21/04; B63B 21/22; B63B 2021/007; G01V 1/38; G01V 1/3843; G01V 1/3852; B63G 2008/005; B63G 2008/007
USPC ..... 405/158, 166, 188, 190, 191; 414/137.7, 414/138.4, 803; 367/15, 20, 154, 177
See application file for complete search history.

(56) References Cited

U.S. PATENT DOCUMENTS

| | | | |
|---|---|---|---|
| 6,606,958 B1* | 8/2003 | Bouyoucos | B63B 21/66 114/242 |
| 7,631,524 B2* | 12/2009 | Araujo | E05B 35/105 70/25 |
| 7,632,043 B2 | 12/2009 | Thompson et al. | |
| 2005/0155814 A1* | 7/2005 | Bath | G01V 1/3852 181/112 |
| 2005/0191165 A1* | 9/2005 | Willis | B63B 21/04 414/803 |
| 2007/0258774 A1* | 11/2007 | Thompson | B63C 11/00 405/190 |
| 2008/0181055 A1 | 7/2008 | Ray et al. | |
| 2009/0052992 A1* | 2/2009 | Thompson | B63C 11/40 405/158 |
| 2009/0324338 A1 | 12/2009 | Thompson et al. | |
| 2010/0157727 A1 | 6/2010 | Woodard, Jr. et al. | |
| 2011/0051550 A1* | 3/2011 | Lindberg | G01V 1/16 367/20 |
| 2011/0164926 A1 | 7/2011 | Joensen et al. | |
| 2011/0217123 A1* | 9/2011 | Jewell | F16L 1/16 405/158 |
| 2012/0134752 A1* | 5/2012 | Eisenhower | G01V 1/18 405/166 |

\* cited by examiner

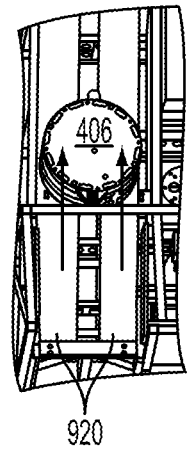 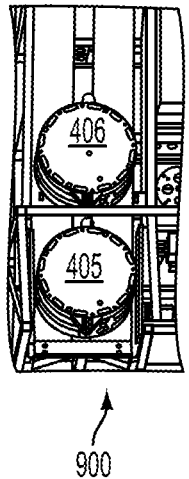 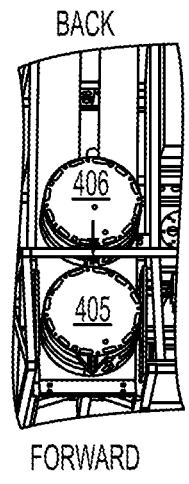
FIG. 22A   FIG. 22B   FIG. 22C
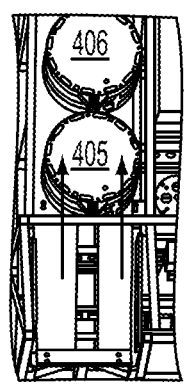 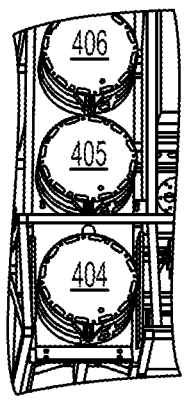 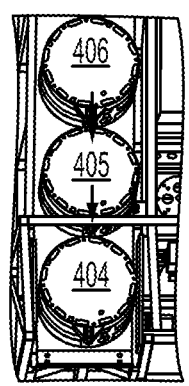
FIG. 22D   FIG. 22E   FIG. 22F

US 9,753,169 B2

DELIVERY AND RECOVERY APPARATUS, METHOD, AND APPLICATIONS

RELATED APPLICATION DATA

The instant application derives priority from U.S. Application No. 61/736,803 filed Dec. 13, 2012, the subject matter of which is herein incorporated by reference in its entirety.

BACKGROUND

1. Field of the Invention

Embodiments of the invention are generally in the field of marine seismic exploration. More particularly, apparatus and methods are disclosed for more efficiently and safely deploying, manipulating, and recovering payload in an unstable (marine) environment.

2. Related Art

Seismic data, long utilized in oil exploration, is increasingly being used not only for exploration, but also in production, development, and exploitation of already producing oil fields, and is typically referred to in the art as 'exploitation seismic.'

In the marine environment, seismic data has conventionally been collected from surface vessels towing long streamers of receivers, and introducing energy with air guns towed behind the same or a separate source vessel. During the past decade, autonomous ocean bottom receivers called 'nodes' or ocean bottom seismometers (OBS) have been developed. Nodes contain their own power source and record seismic data passively and continuously from the time they are placed on the sea bed and started until stopped and/or retrieved.

Three dimensional seismic imaging has been common for three decades, but in recent years, as exploitation seismic has matured, the fourth dimension, time, has importantly emerged. In 4D seismic, the identical (as nearly as possible) 3D seismic programs are repeated at time intervals ranging from a few months to a few years, and those results are then compared. The differences can be and are attributed to the changes in the oil field itself as a function of production. This in turn allows the oil field production managers to better place future wells and/or manage their injectors and current production wells to maximize the exploitation of the resource.

The costs of ocean bottom recording typically significantly exceeds that of surface seismic, predominantly incurred through the placing and recovering of the ocean bottom equipment. As oil production moves to deeper and deeper waters, these costs escalate. In the case of nodes in very deep water, the nodes are placed and recovered by heavy work class remotely operated vehicles (ROVs), which are not only expensive on their own, but also require pilots, other crew, redundancy, maintenance, power, and deck equipment further requiring larger vessels, which together make these operations exceedingly expensive. Due to the expense, ocean bottom receivers are generally placed on a very course (e.g., 200 to 600 meter) grid and are shot into with a fine surface source grid. However, merely transiting a large grid with an ROV(s) and ROV equipped vessel involves substantial time and expense.

In deep water, ROVs are most often launched and recovered from surface vessels or platforms coupled with their tether management system (TMS). Together the TMS and ROV are overboarded and suspended in the water column from the surface by an umbilical. The umbilical is usually a heavy armored cable that carries power and data connections therein, connecting the ROV/TMS to the surface. When at operating depth, the ROV is disengaged from the TMS and is able to 'fly free' of the TMS connected by a much lighter and more flexible cable called a tether. Like the umbilical, the tether transmits power and data between the ROV and the TMS via conductors. The TMS remains suspended in the water column beneath the surface vessel or platform by way of the umbilical.

Recovering the ROV is a two step process. The ROV must return to and dock safely with its TMS, the TMS recovering slack tether in the process. Once joined, they are winched back to the surface with the umbilical. Both operations may involve substantial hazards. In the case where the TMS is suspended from a surface vessel, it is subject the same motion (in some cases amplified motion) as the surface vessel unless heave compensation is employed. Various heave compensation means are available but all are expensive and add wear and tear on the umbilical, another exceedingly expensive item.

The joined TMS and ROV are highly susceptible to damage when transiting the air/water interface until safely secured in position on the deck, predominantly due to the motion of the vessel. Together with the fact that recovering the package from great depths can itself be time consuming, minimizing the number of times the ROV must be recovered to the vessel is crucial to efficient operations. In addition, there are safety concerns for the crew during recovery operations not present when the ROV(s) remains at depth.

For ROVs engaged in deploying nodes and other OBS system components, subsea reloading of the ROV with suitable components is a desirable alternative to recovering the ROV and reloading it on the surface. Several mechanisms to permit this are in use; for example, U.S. Pat. No. 7,632,043 discloses a second device (reloader) that is loaded on a surface vessel with a replacement payload for the ROV. This device and payload are lowered through the water column to the sea bed in close proximity to the ROV. The ROV, flying free of its TMS on its tether and using fixtures and machinery it carries designed specifically for this purpose, engages with the reloader and effects an exchange of the payload from the reloader to the ROV. After the exchange, the ROV departs the reloader and continues its mission on the sea floor while the reloader is winched back to the surface and back aboard the vessel.

As disclosed, this exchange is conducted on the sea floor for a very practical reason: the reloader is stationary on the bottom and not subject to vertical motion owing to the surface vessel's heave to which it is subject during its descent/ascent. However there are both hazards and time consuming problems associated with landing this heavy machinery on the sea bottom. The sea bed contour may not be suitable to land the reloader, or there may be other expensive ocean bottom assets that must be avoided requiring the surface vessel to reposition itself and all the suspended equipment to a more suitable location. Moreover, where the bottom is soft and or mud, visibility required to engage the reloader can be obstructed for long periods of time owing to the light currents generally encountered at significant ocean depths.

In regard to productivity, the necessity of landing the reloader on the sea bottom to effect the transfer requires the surface vessel to stop and hold position on the surface. While the transfer is in progress and until concluded, all production is halted, even in the event a second ROV, which still has payload, is in use.

Moreover, "reloaders" as described here and elsewhere have their own inherent problems. Firstly, they tend to be large massive machines making them expensive, maintenance intensive, large consumers of valuable deck space, and requiring their own launch and recovery systems (LARS), while ROVs constitute a second piece of large machinery subject to all these same shortcomings and additionally large power consumers requiring even more resources aboard.

For all the foregoing reasons and others appreciated by those skilled in the art, there exists a need to affect the exchange of nodes between a surface vessel and an ROV operating at depth without the need for "reloader" machinery at all or using minimal machinery that is sufficiently light, simple, and inexpensive that a dedicated LARS is unnecessary. Furthermore, if that transfer can be accomplished in the mid-water column while the vessel, TMS, and loader are in-transit and advancing on the next deployment location, the exchange may be accomplished with no delay owning to this activity.

Definition of Terms

The following terms, among others, will be used herein in describing non-limiting, exemplary, and illustrative embodiments and aspects of the invention, and are described below to assist the reader in clearly understanding the invention.

Water Column: The vertical (depth) volume of water between the surface and sea or lake bottom wherein marine seismic-related activities are being conducted. Mid-water column refers to a depth intermediate the surface and the sea bottom where, e.g., 'suspended machinery' may be operationally positioned.

Remotely Operated Vehicle (ROV): a submersible, remotely-controlled vehicle generally coupled to a tether management system (TMS), and considered a 'payload station.' Free flying ROV refers to an ROV that has been mechanically disconnected from its TMS and joined to its TMS only by means of the flexible tether allowing it to move independently of that TMS. The TMS is further connected to a surface or near surface vessel, platform or other structure by means of an umbilical. Together the tether and umbilical carry power and data between the ROV and the surface.

Conveyor: Conveyor refers to any conveyance mechanism including but not limited to conveyor belts, mesh, rollers, chains, slide(s), inclined plane, or other devices or machinery enabling the movement of items along some path, fixed or alterable, from one point in space to a second point in space.

Lift line: This is a line, rope, cable, or similar flexible member that will carry the complete payload package while transiting between the surface vessel and the ROV. A first end is affixed to lift machinery aboard the vessel such as a winch capable of controllably lowering or recovering the line with or without payload. In some embodiments the lift line has non-payload devices added for operational purposes to be described below. The lift line may also have one or more passive affixment points made part of it, or coupled to it, by knot, splice, crimp, connector, or other mechanism including at or near an opposite second end, to which payload or other devices, lines, or weight may be affixed.

Payload: Payload refers to one or more seismic sensor devices (e.g., 'nodes;' autonomous nodes') but possibly including other devices that may be delivered via the lift line from the surface vessel to the ROV and transferred to the ROV in deployment operations. During recovery operations payload is transferred by a reverse process from ROV to surface vessel via the lift line, said reverse process consisting of the same, similar or different set of steps.

Node: an ocean bottom sensor (OBS) or seismic sensor device representing a 'payload' or 'unit payload.'

Non-payload devices: Non-payload devices may include weights, wings, or other miscellaneous items that can be affixed by various means to the lift line but are not transferred to the ROV when payload is transferred.

Tag line: Tag lines are used in some embodiments to carry lift from the lift line to negatively buoyant payload or no-payload devices.

Tie down devices: Tie down devices may be lines, ropes, or other flexible or rigid members which do not carry the weight of negatively buoyant payload or no-payload devices but instead controllably hold a device in some desired relationship to the lift line for purposes of controlling the motion of the devices that might occur as a result of drag during ascent, descent, or horizontal motion of the lift line.

Active affixment device: Active affixment device is a latch, catch, snap, shackle, or other functionally similar device (generally having moving parts) that can be manipulated by some other device, e.g., a robotic arm, on the ROV so as to connect or disconnect two devices, one from the other. Active affixment devices may be on one or both ends of a tag line, one or both ends of a tie down device, and one or more points on a payload or no-payload device. Active affixment devices can engage passive affixment devices including those that might be fixed at various places along the lift line, other active affixment devices, or slidably engaged with the lift line, a tag line, or a tie down.

Passive affixment device (also passive affixment point): Passive affixment device is a shackle, ring, knot, loop, thimble, or functionally similar device (generally without moving parts), which may be engaged by active affixment device(s), or joined with one or more other passive affixment devices to form forks in tag lines, tie downs, or the lift line. These devices may be on one or both ends of a tag line, one or both ends of a tie down device, and one or more points on a payload or non-payload device. In some embodiments a passive affixment device might be slidably engaged with a tag line, tie down or the lift line. The lift line may also have one or more passive affixment points made part of it by knot, splice, crimp, or other ways, including at or near its second end, to which payload or non-payload devices, lines, or weights might be affixed.

In-transit: In-transit means the dynamic or passive operational motion of an object; e.g., a surface vessel under steam (dynamic); an object being towed by a surface vessel (passive); the motion of an ROV from point A to point B; etc.

SUMMARY

Embodiments of the invention are apparatus and methods enabling the capture and manipulation of a payload at relatively deep-water working depths in an unstable marine environment (water column) while the payload may be in-transit.

An exemplary embodiment is a method for deploying and manipulating a payload in an unstable environment that includes the steps of deploying a plurality of unit payloads from a marine surface vessel, further comprising: providing, on the marine surface vessel, the plurality of unit payloads each having a plurality of affixment devices connected thereto; detachably linking at least two of the plurality of unit payloads via respective ones of the affixment devices on the marine surface vessel to form a payload chain; detachably coupling the payload chain to a lift line that is controllably deployable from the marine surface vessel into/out of a water column; and deploying the lift line and the coupled payload chain into the water column. In various non-limiting, exemplary aspects the embodied method may include some or all of the following steps, limitations, and/or characteristics:

wherein the plurality of affixment devices connected to each unit payload includes a passive affixment device and an active afixment device;
  wherein the step of detachably linking at least two of the plurality of unit payloads comprises detachably connecting a passive affixment device of a respective unit payload with an active affixment device of a respective immediately adjacent unit payload;
  wherein the passive affixment device and the active afixment device of each unit payload are diametrically disposed about a perimetal region of each unit payload;
wherein the step of providing, on the marine surface vessel, the plurality of unit payloads, further comprises orienting each of the plurality of unit payloads in a manner such that its passive affixment device is in a deployment leading position and its active affixment device is in a deployment trailing position;
  wherein the step of detachably coupling the payload chain to a lift line further comprises detachably coupling a first end of a tag line to the terminal trailing active affixment device wherein a second end of the tag line is fixedly coupled to the lift line;
    further comprising slidably coupling the first end of the tag line to the lift line;
    further comprising slidably, detachably coupling the passive affixment device of the leading unit payload to the lift line;
wherein the surface vessel and the deployed payload chain are in-transit;
further comprising capturing the payload chain in the water column, further comprising: providing an ROV including a robotic arm and a payload stowage compartment, in the water column in proximity to a leading end of the deployed payload chain; de-coupling the passive affixment device of the leading deployed unit payload from the lift line; starting with the de-coupled leading deployed unit payload, drawing the payload chain into the stowage compartment while controlling the ROV to fly upward and forward; and upon at least partial capture of the payload chain, de-coupling the terminal, trailing, active affixment device of the payload chain from the first end of the tag line;
  further comprising unlinking the payload chain in the stowage compartment.

An exemplary embodiment is a method for manipulating and recovering a payload from a submerged ROV in an unstable environment to a marine surface vessel, including the steps of: providing an ROV including a robotic arm and a payload stowage compartment including a payload chain consisting of a plurality of detachably linked unit payloads each having a plurality of affixment devices connected thereto; providing a deployed lift line including a tag line having a passive affixment device attached to a first end thereof and being fixedly coupled at a second end thereof to the deployed lift line from the marine surface vessel; capturing the passive affixment device attached to the first end of tag line with the robotic arm and engaging it with an active affixment device disposed on a leading stowed end of the payload chain; and extracting the node chain from the stowage compartment of the ROV. In various non-limiting, exemplary aspects the embodied method may include some or all of the following steps, limitations, and/or characteristics:

wherein the step of extracting the node chain from the stowage compartment of the ROV further comprises controlling the ROV to fly downward and away from the lift line;
wherein the surface vessel, the deployed lift line, and the ROV are in-transit.

An exemplary embodiment is an ocean bottom sensor (OBS), including: a housing; a plurality of affixment devices connected thereto, wherein the plurality of affixment devices includes at least one passive affixment device and at least one active affixment device diametrically disposed. In various non-limiting, exemplary aspects the embodied OBS may include some or all of the following components, limitations, and/or characteristics:

the ocean bottom sensor (OBS) of claim comprising a plurality of the OBSs detachably linked to form a chain of OBSs, wherein a passive affixment device of one OBS is connected to an active affixment device of an immediately adjacently disposed OBS.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTIONS OF FIGURES

Figure 9:
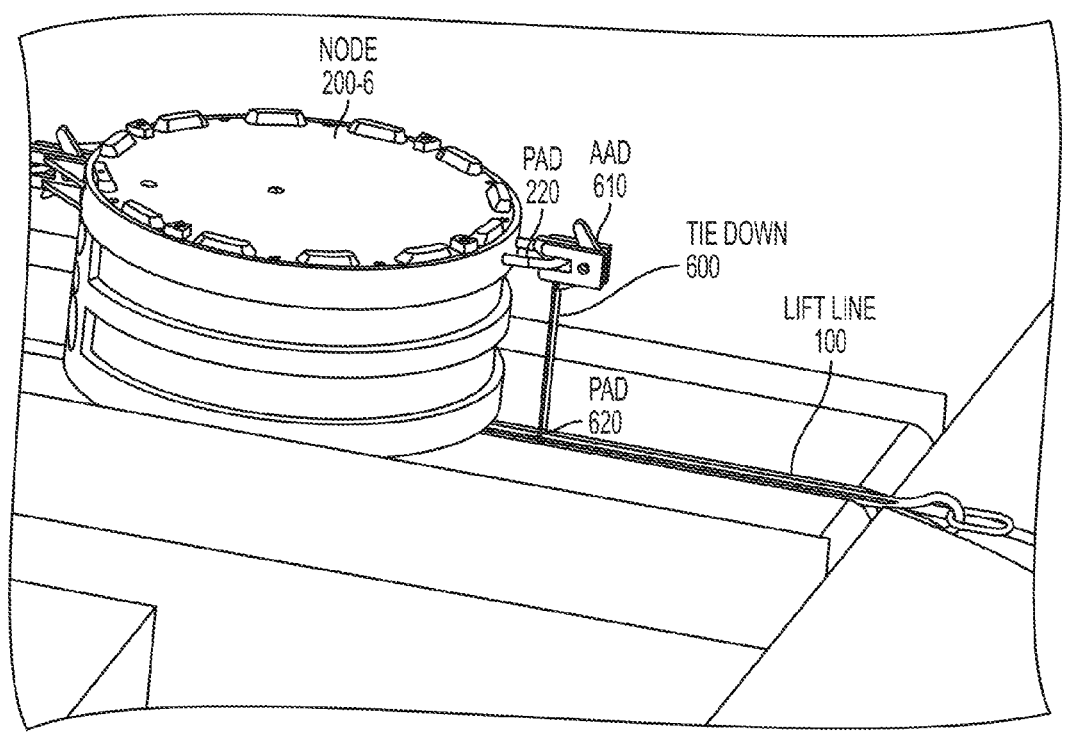
Figure 10:
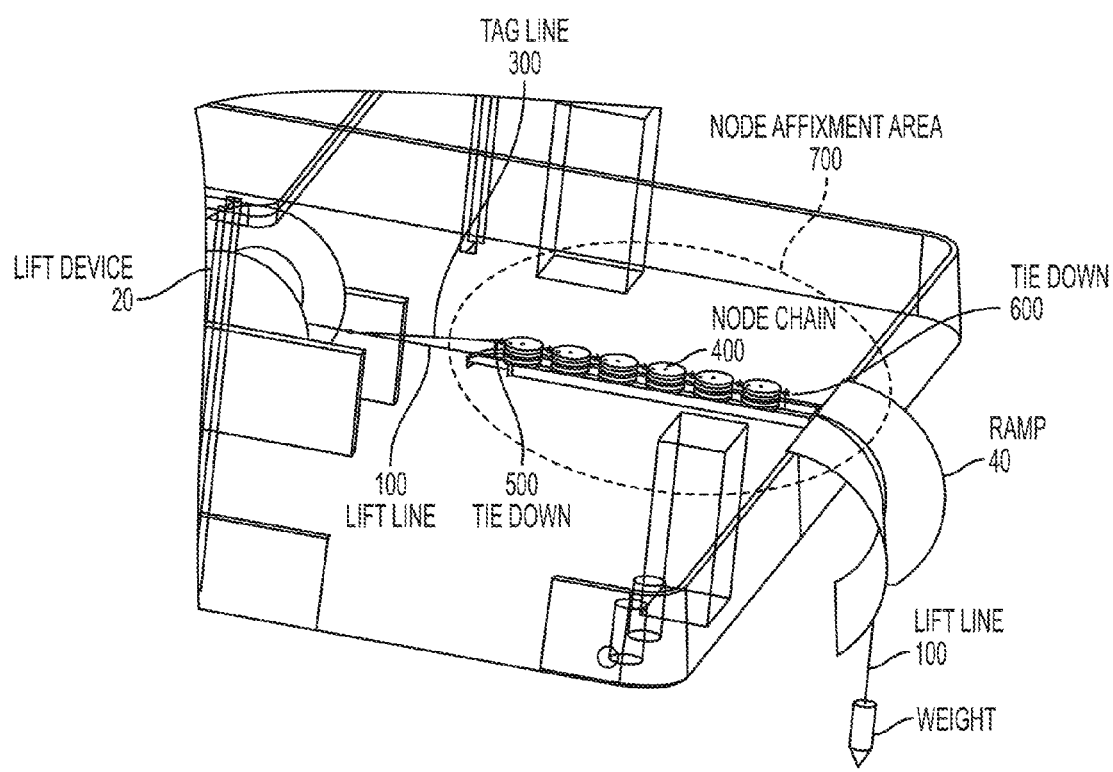
Figure 11:
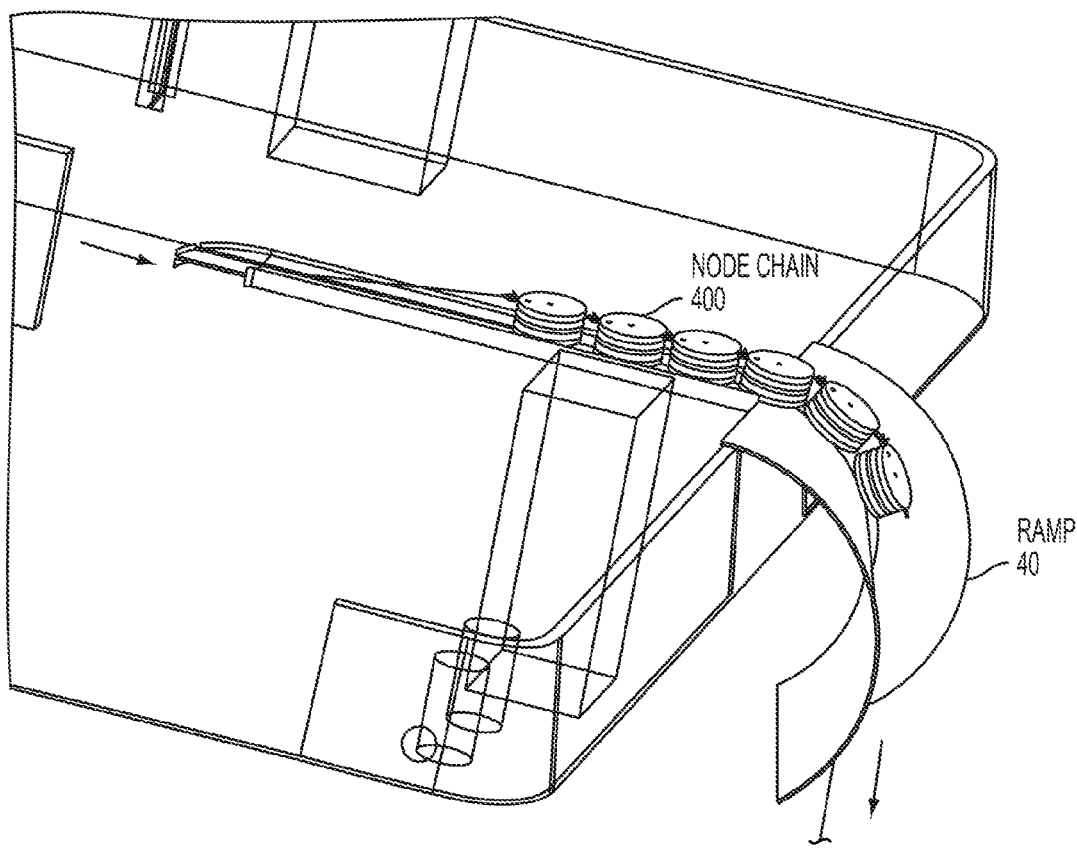
Figure 12A:
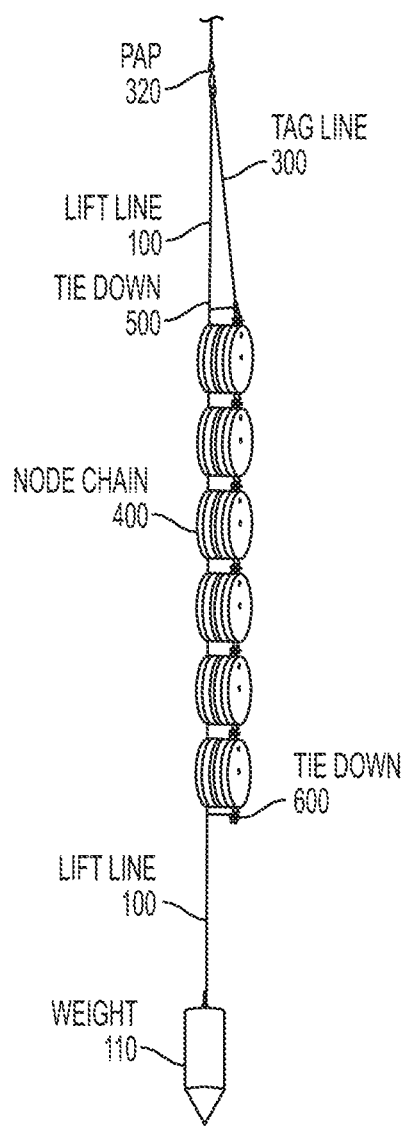
Figure 12B:
Figure 13:
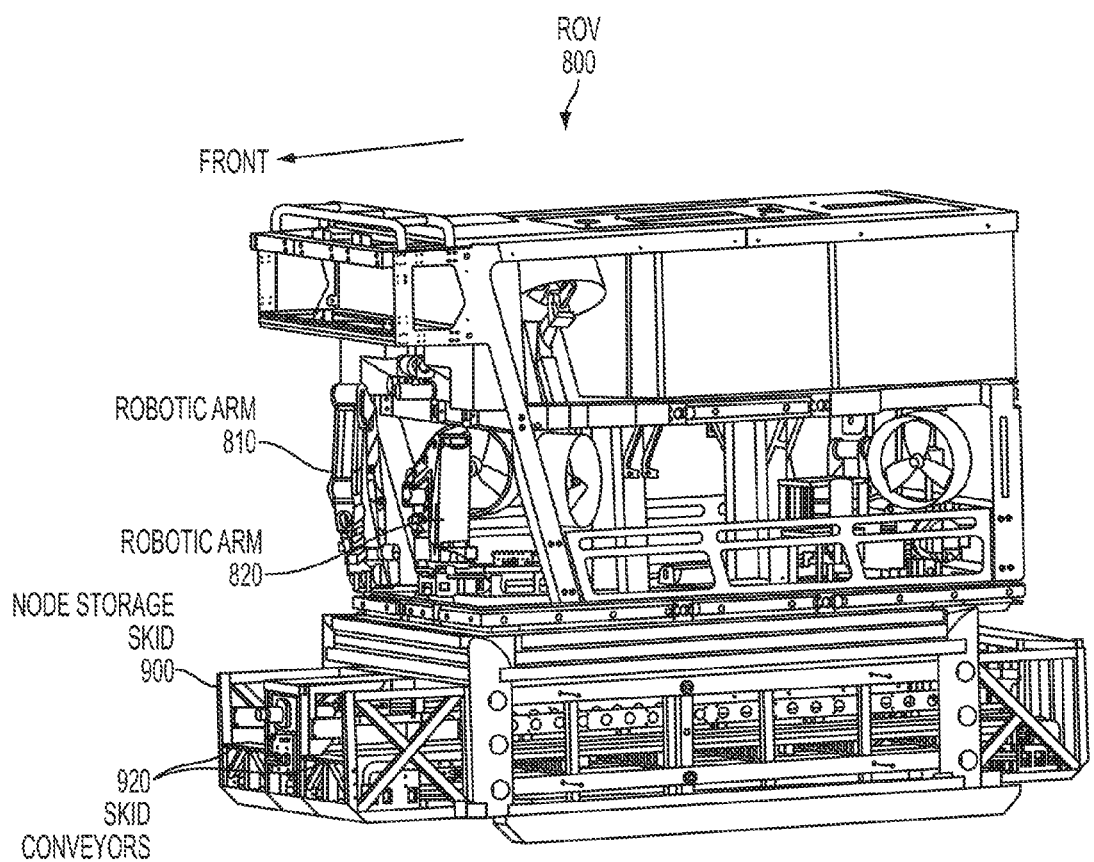
Figure 19A:
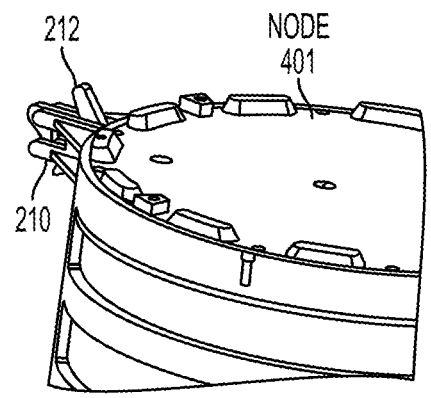
Figure 19B:
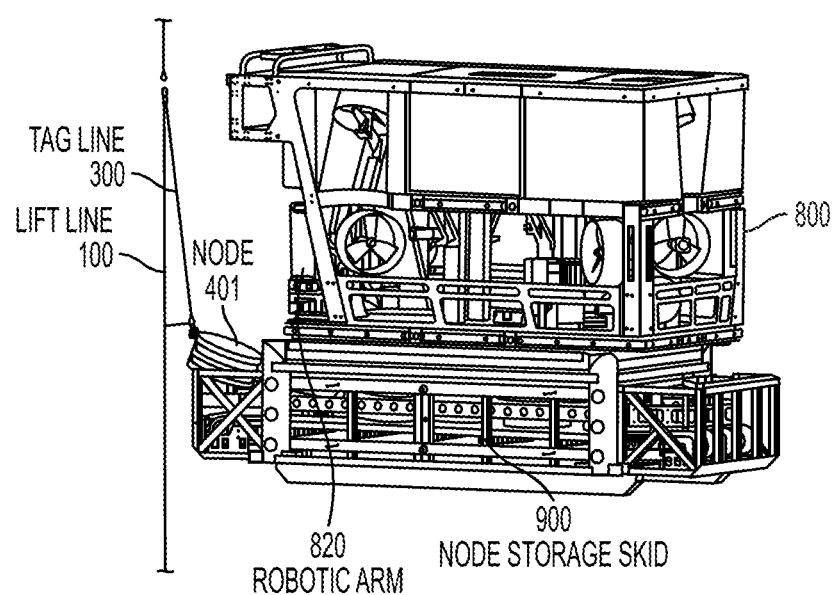
Figure 20:
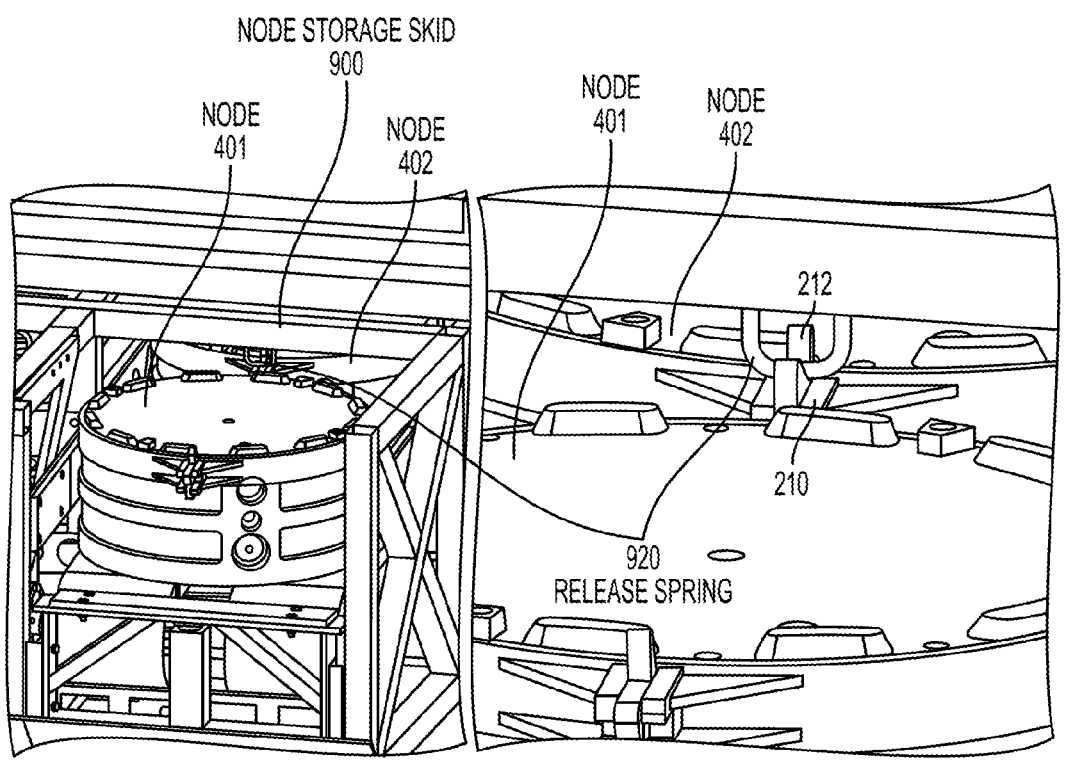
Figure 21:
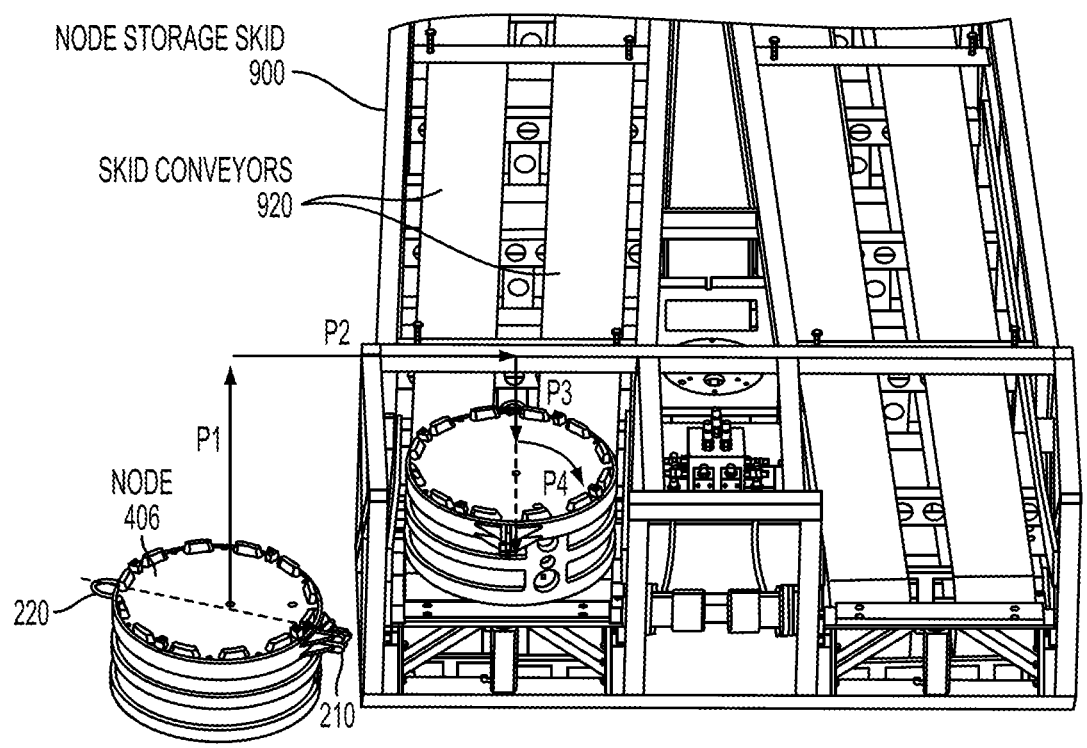
Figure 23:
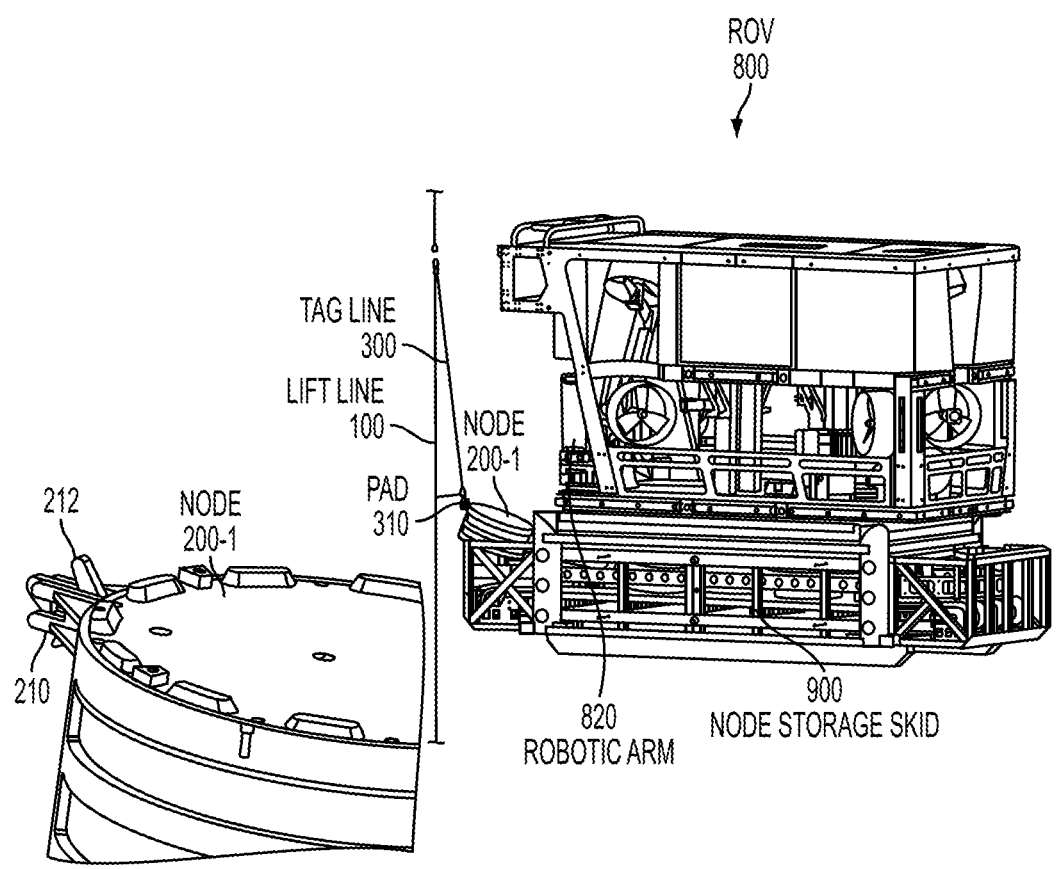
Figure 24:
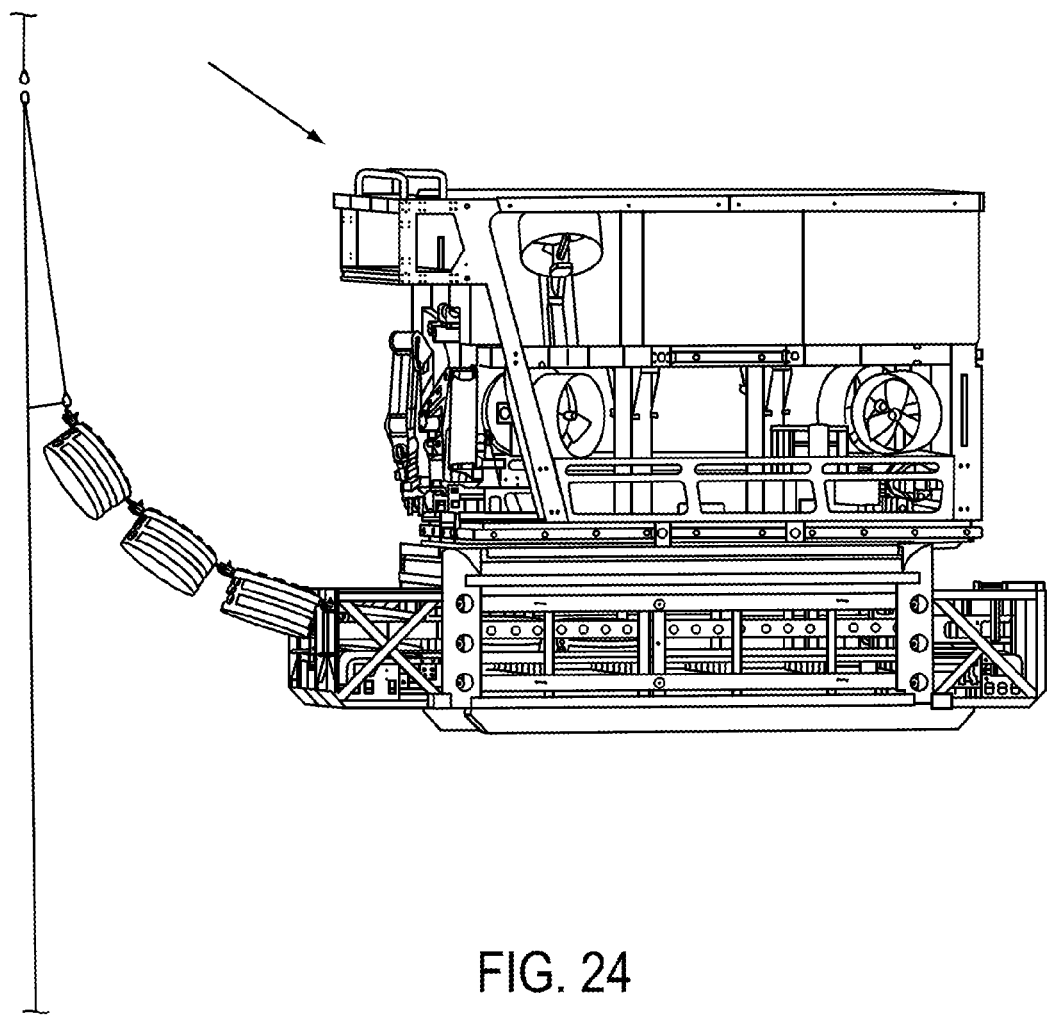
Figure 25:
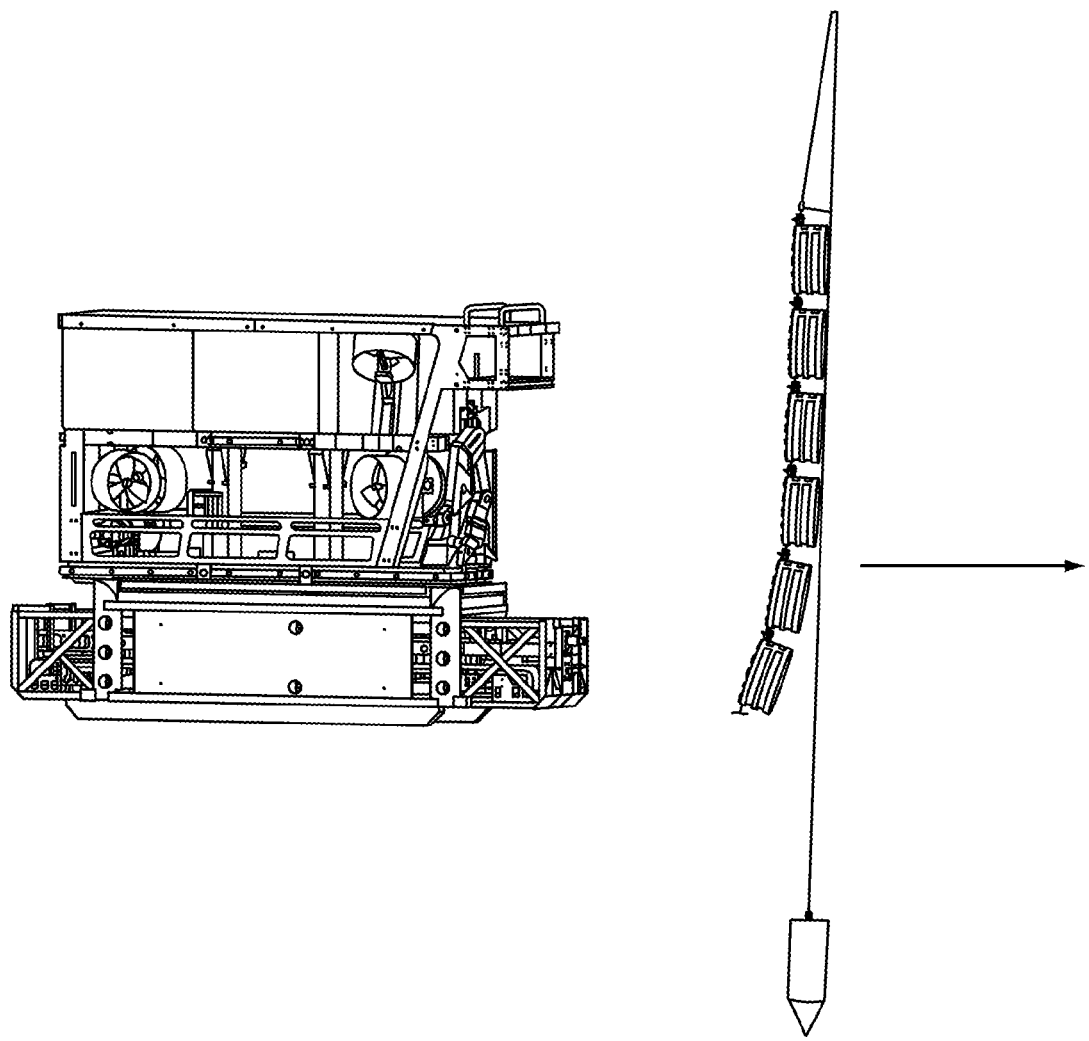
Figure 26:
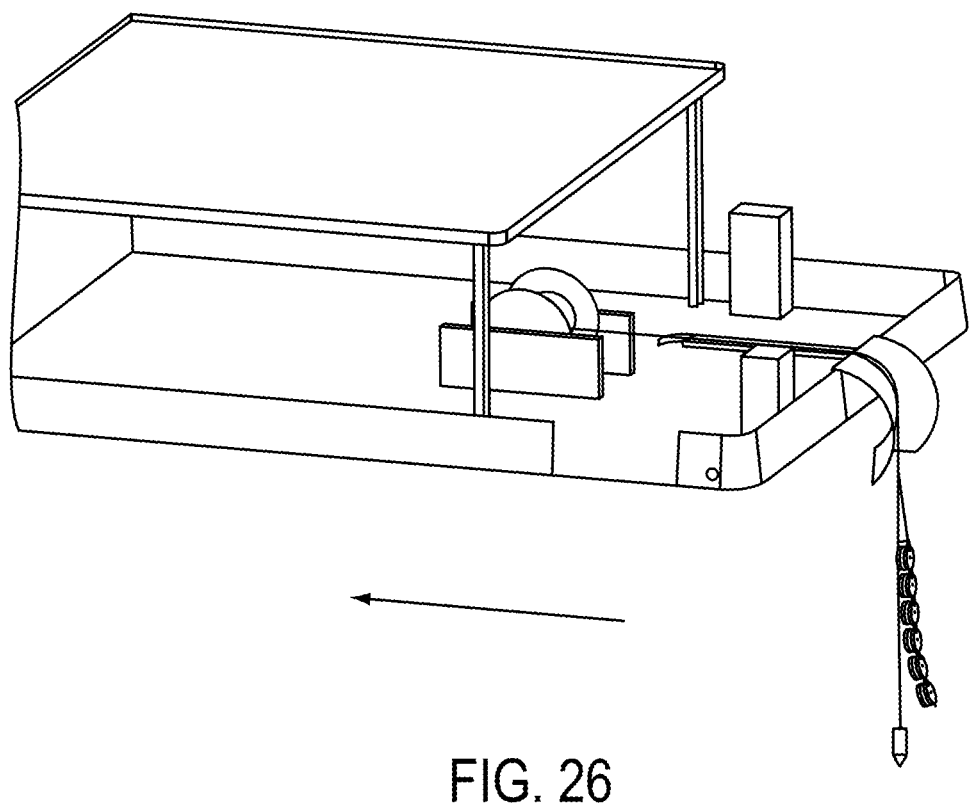

FIG. 9, in similar fashion, shows details of the most forward node of the node chain constrained in relation to the lift line by a tie down, according to an illustrative aspect of the invention;

FIG. 10 illustrates the node chain fully affixed to lift line in a node affixment area by a tag line and tie downs, and ready for deployment into the water column, according to an illustrative aspect of the invention;

FIG. 11 illustrates the node chain being deployed from the stern of the surface vessel, according to an illustrative aspect of the invention;

FIGS. 12a and 12b, respectively, a node chain and two serial node chains deployed in a water column, according to an illustrative aspect of the invention;

FIG. 13 shows an ROV equipped with two robotics arms and a node storage compartment, according to an illustrative aspect of the invention;

FIGS. 14-18 show a deployed node chain in the water column prior to and being captured by an ROV, according to illustrative aspects of the invention;

FIGS. 19(a, b), illustrate the ROV 800 employing its robotic arm to release the active affixment device of the last node by actuating the node's affixment device, leaving the entire node chain free of the tag line previously carrying lift from the lift line to the node chain, according to illustrative aspects of the invention;

FIG. 20 illustrates one of many ways to release the individual nodes that make up the node chain from each other in the storage area of the ROV so they can be deployed individually on the ocean bottom using the ROV robotic arm, according to an illustrative aspect of the invention;

FIG. 21 illustrates a node recovery process that begins with the ROV recovering a first node from the ocean bottom with its robotic arm and placing it in the node storage skid on the skid conveyor in the ROV, according to an illustrative aspect of the invention;

FIGS. 22(a-f) illustrate the process of re-creating the node chain from the individual recovered nodes in the storage skid of the ROV, according to illustrative aspects of the invention;

FIG. 23 illustrates how the ROV is controlled to fly back to a position in close proximity to an unused tag line on the lift line, and employ its robotic arm to acquire the passive affixment device of the tag line and engage it with the active affixment device of the leading (recovery) node of the node chain, according to an illustrative aspect of the invention;

FIG. 24 illustrates the ROV advancing the skid conveyors inside the node storage skid while flying down and away from the lift line, leaving the weight of the node string to be carried by the tag line, according to an illustrative aspect of the invention;

FIG. 25 shows the ROV flying free of the node chain so that the node chain can be recovered to the surface and the ROV can return to recover additional nodes, according to an illustrative aspect of the invention; and FIG. 26 illustrates how the node chain hangs in the water column with a natural concave curve through center points of the node covers, according to an illustrative aspect of the invention.

DETAILED DESCRIPTION OF EXEMPLARY, NON-LIMITING EMBODIMENTS OF THE INVENTION

Figure 1:
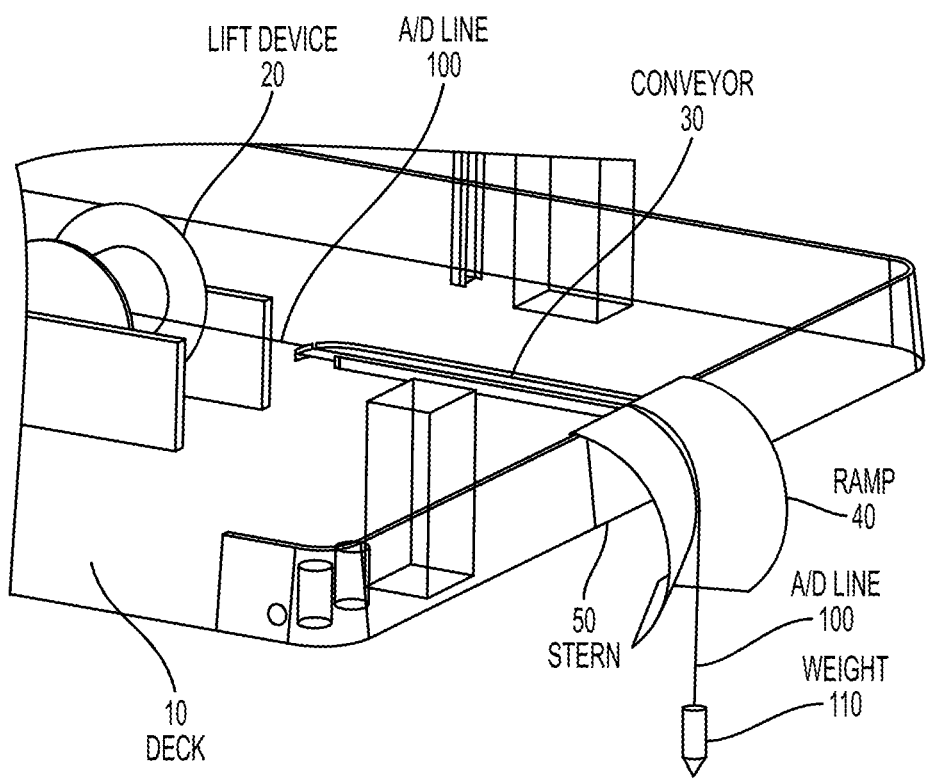
FIG. 1 illustrates an exemplary deck configuration of a marine seismic exploration surface vessel, according to an illustrative aspect of the invention.

FIG. 1 illustrates an exemplary deck 10 configuration of a marine seismic exploration surface vessel. A first end of a lift line 100 is affixed to a lift device 20 (e.g., winch) mounted on the deck 10, passes down a center path of a conveyor 30, and over a ramp 40 overhanging the stern of the vessel. The second end of the lift line 100 is tensioned by weight 110. Ramp 40 may incorporate rollers, sheaves, or other mechanisms to reduce friction between the ramp 40 and lift line 100.

Figure 2:
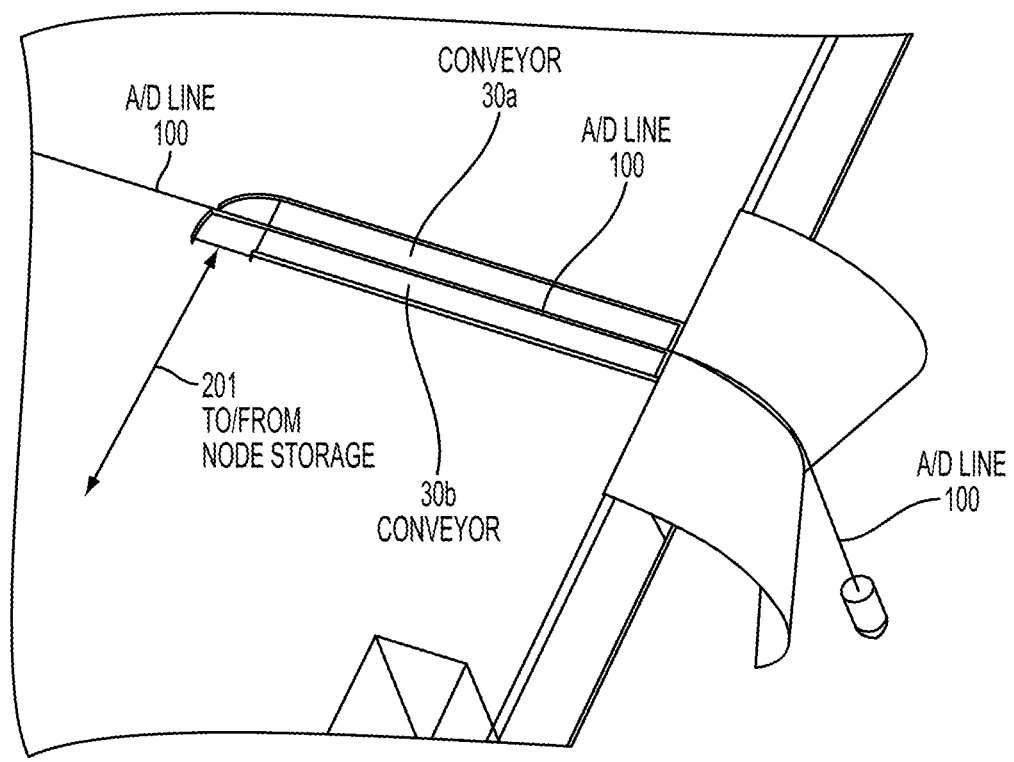
FIG. 2 shows a different view of the deck illustrated in FIG. 1.

FIG. 2 provides a different view of deck 10. Conveyor 30 is in two parts: 30a and 30b, such that lift line 100 may pass down the center of the conveyor below a top level of the conveyors 30a and 30b so as to allow nodes 200 (FIG. 3) to be transported on the conveyor surface without interference from the taught lift line 100. A path to and from a node storage area (not shown) is indicated at 201.

Figure 3:
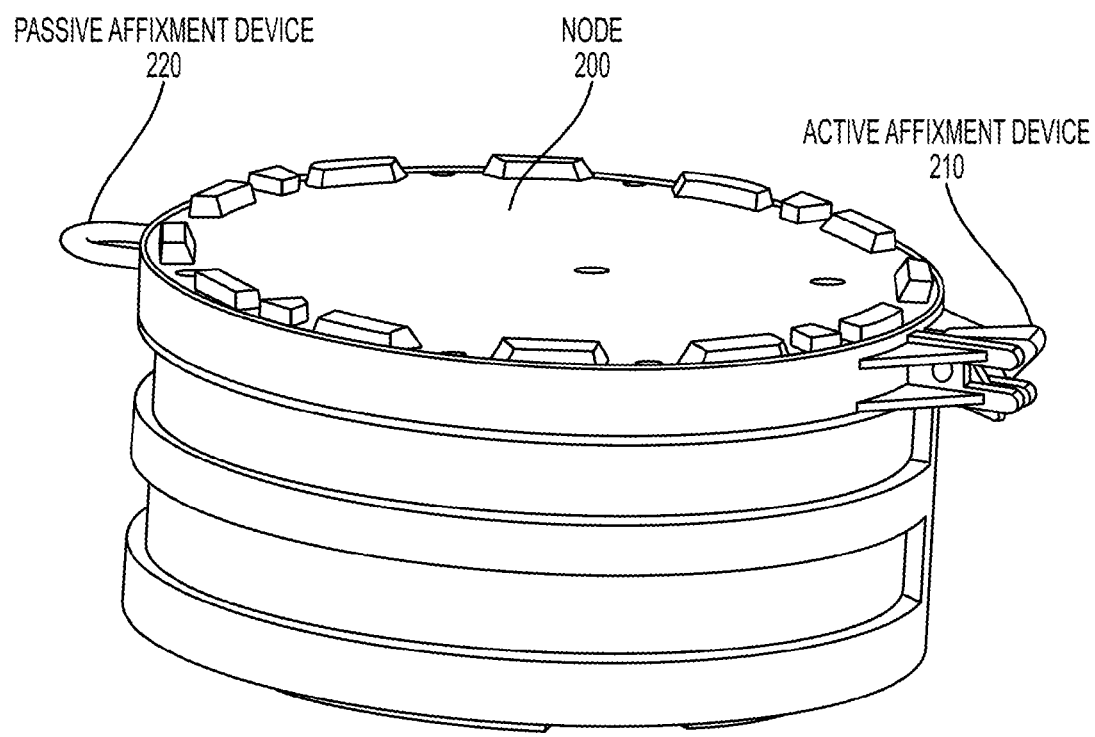
FIG. 3 illustrates a single OBS (node) equipped with two attachment apparatus at opposing perimetal locations, according to an illustrative aspect of the invention.
Figure 4:
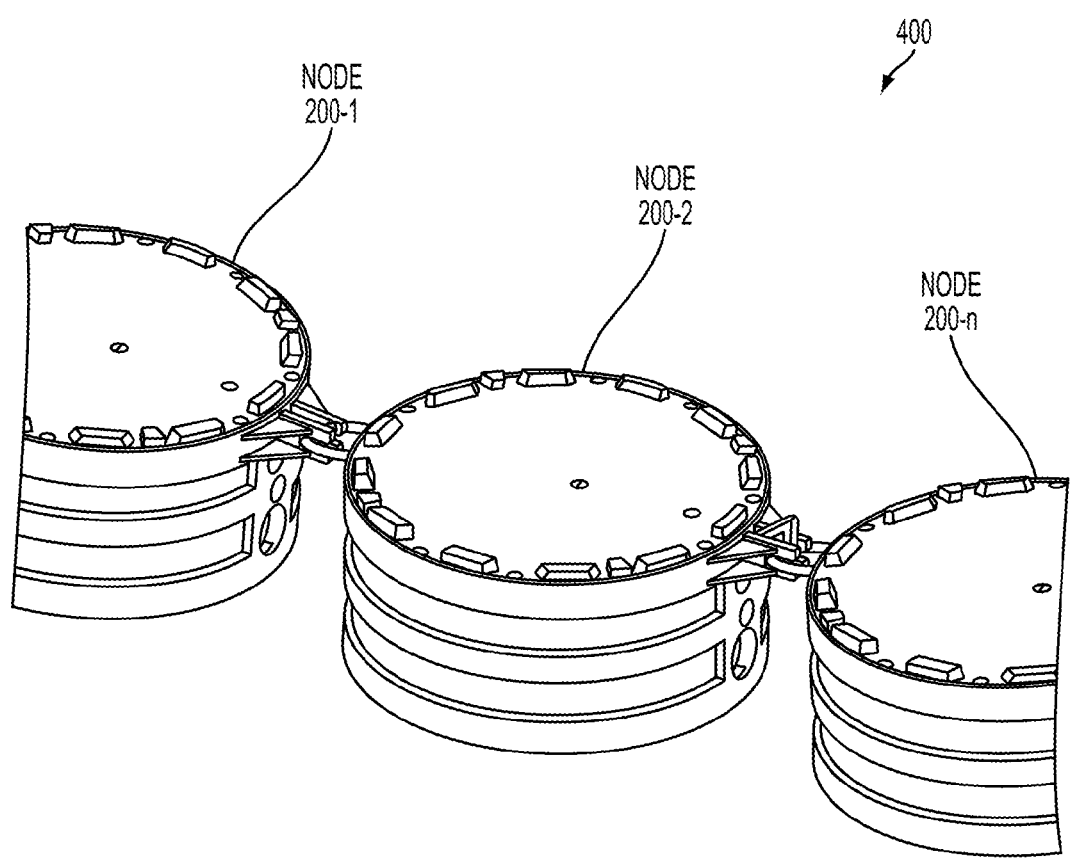
FIG. 4 illustrates a linked chain of nodes, according to an illustrative aspect of the invention.
Figure 6:
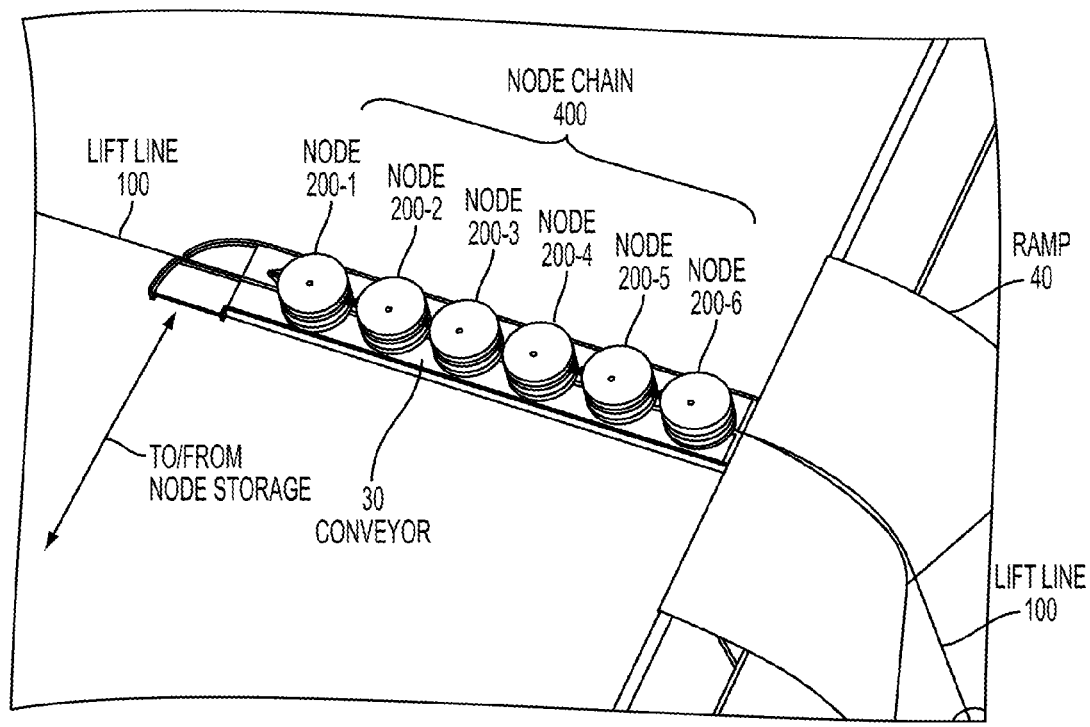
FIG. 6 shows a chain of nodes delivered from a node storage area oriented on a conveyor, according to an illustrative aspect of the invention.

FIG. 3 illustrates a single node 200 equipped at opposing perimetal locations with two attachment apparatus, an active affixment device 210 and a passive affixment device 220. The active affixment device 210 is of a type resembling a self-locking gate latch, which when engaged with a properly sized passive affixment device of an immediately adjacent node will open to allow that passive affixment device to enter, but once fully engaged will not allow the release of same without outside action. Specifically, the active affixment device 210 will engage and capture the passive affixment device 220 (as well as other passive affixment devices) of an immediately adjacent node so as to form a linked chain of nodes 400 as seen in FIGS. 4 and 6. The number of linked nodes can be controlled as desired up to the carrying capacity of the associated machinery.

Figure 5A:
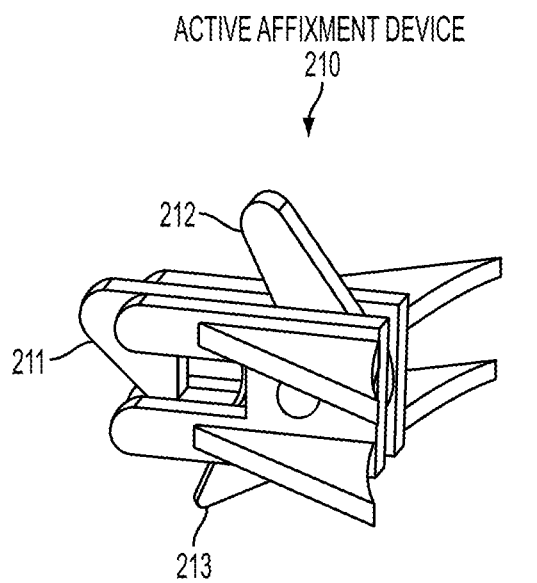
FIG. 5a shows the detail of an active affixment device of a node in a closed/locked position.
Figure 5B:
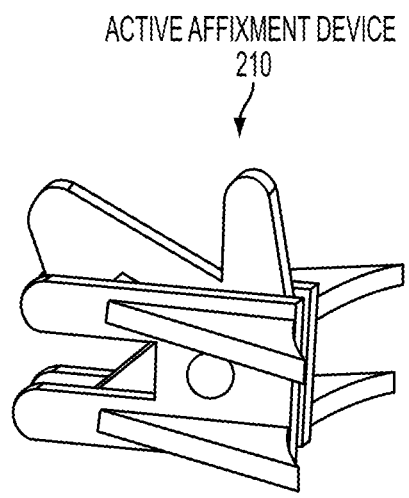
FIG. 5b shows the detail of the active affixment device in an open/release position, according to non-limiting, illustrative aspects of the invention.

FIG. 5a shows the detail of a non-limiting, exemplary, active affixment device 210 in a closed/locked position and, in FIG. 5b, in an open/release position. The device may be spring- or tension-loaded so as to remain closed unless acted upon at an activation point (e.g., 211, 212, or 213) as illustrated.

In FIG. 6, nodes delivered from a node storage area are shown oriented on the conveyor 30 joined one to another to form the illustrated six node chain 400. The node chain 400 is not at this point attached to the lift line 100.

Figure 7:
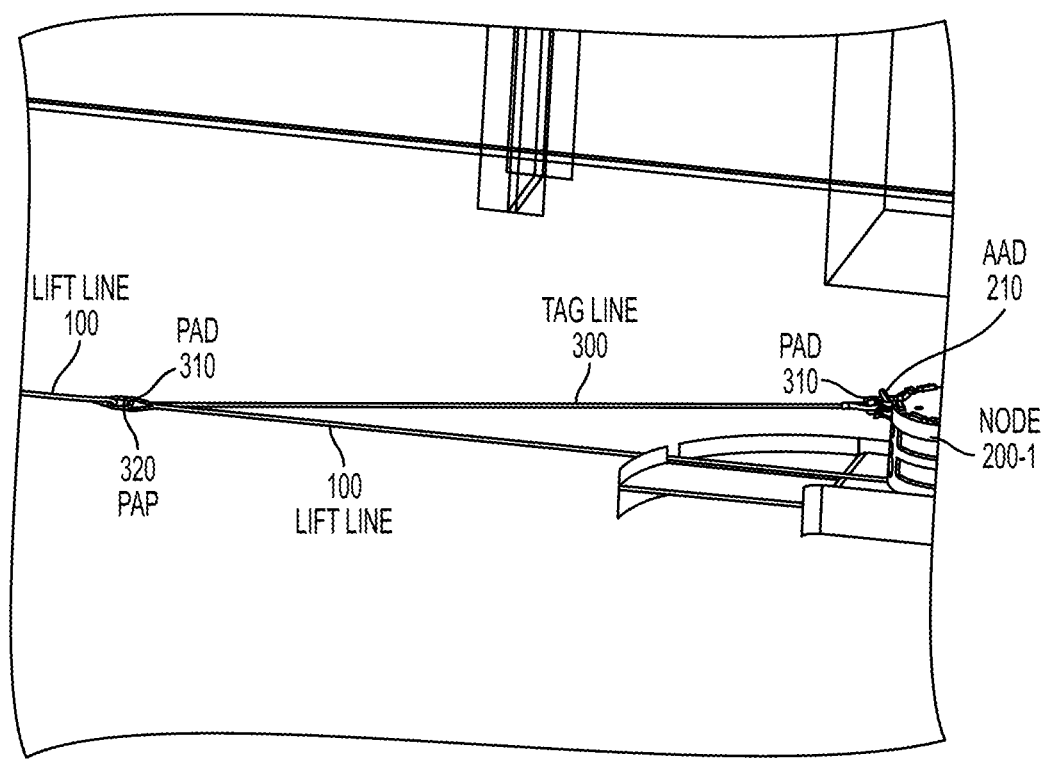
FIG. 7 shows a tag line attaching the node chain to the lift line, according to an illustrative aspect of the invention.

In FIG. 7, the node chain 400 is affixed to the lift line 100 via a tag line 300. Tag line 300 has an affixment device 310 (active or passive) on each end thereof. The first end of the tag line is fixedly attached to the lift line 100 at 320 by a coupling component. The second end of the tag line is engaged with and captured by the active affixment device 210 on the forward most node 200-1 of the node chain 400. Tag line 300 carries lift from the lift line 100 to the node chain 400 once the assembly passes overboard on the ramp 40 shown in FIG. 6.

Figure 8:
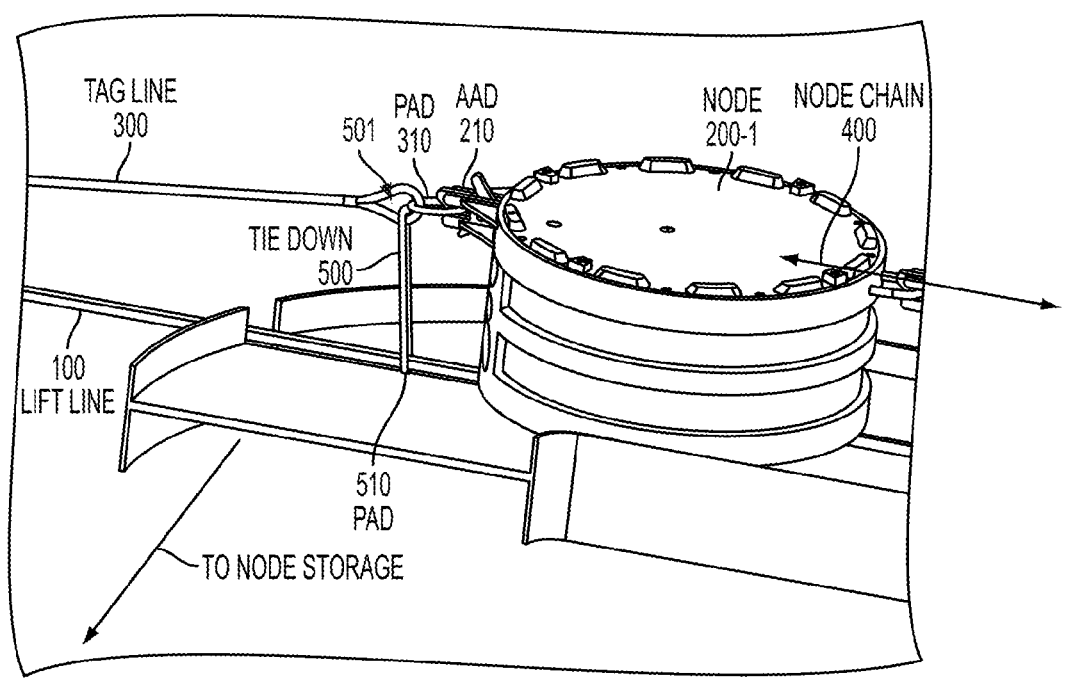
FIG. 8 shows details of the most rearward node of the node chain constrained in relation to the lift line by a tie down, according to an illustrative aspect of the invention.

In FIG. 8, the most rearward (on launch) node 200-1 of node chain 400 is shown constrained in relation to the lift line 100 by a tie down 500, the first end (501) of which is in fixed engagement with tag line passive affixment device 310 and the second end (510) of which is slidably engaged with the lift line 100. This keeps the bottom of node 200-1 in close proximity to the lift line 100, preventing the node chain 400 from being pushed away from the lift line 100 by propeller wash or other hydrodynamic forces that might be encountered once the assembly is in the water and the vessel is in motion. The tie down 500 is illustrated as a rigid member but may be a flexible line, a rope, or coupler with appropriate terminal hardware as known in the art.

As shown in FIG. 9, in similar fashion, the illustrated first (most forward-on launch) node 200-6 in node chain 400 is constrained by tie down 600, the first end of which is, or includes, an active affixment device 610 in releasable, fixed engagement with the passive affixment device 220 attached to node 200-6, and the second end (620) of which is slidably engaged with lift line 100, similar to that of tie down 500 as described above.

FIG. 10 illustrates the node chain 400 fully affixed to lift line 100 in a node affixment area 700 by tag line 300, tie down 500, and tie down 600, and ready for deployment into the water column. The lift device 20 pays out lift line 100 while the conveyors beneath node chain 400 are active towards the stern causing the node chain 400 to move aft and subsequently over the ramp 40 as illustrated in FIG. 11. Once overboard and clear of the ramp 40, the node chain 400 will orient itself in a roughly vertical orientation as seen in FIG. 12a. As illustrated in FIG. 12b, multiple node chains 400 may be serially connected so as to transit the water column in a single descent. The weight 110 produces tension in the lift line 100 between the weight 110 and the fixed passive attachment point 320 (FIG. 7) in the lift line 100. Increasing the mass of weight 100 increases the tension in this section of lift line 100 causing it to act like a rigid pipe member. Because the node chain 400 is fixed at top and bottom in close proximity to this section of lift line by tie downs 500 and 600, the entire assembly can be allowed to descend through the water column at relatively high speeds, which might otherwise cause severe or uncontrolled motion in the node chain 400.

FIG. 13 shows an ROV 800 equipped with two robotics arms 810 and 820 and a node storage compartment (skid or tray) 900.

Figure 14:
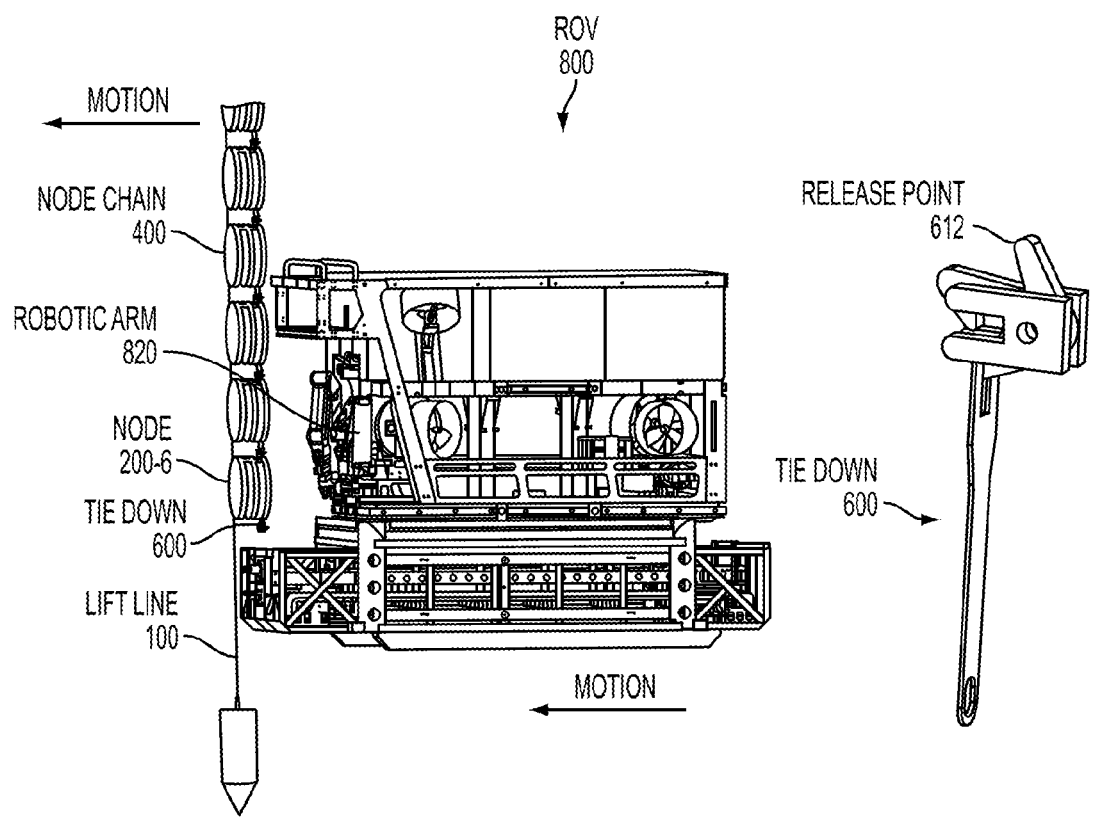

As shown in FIG. 14, while the surface vessel (and therefore the trailing node chain) is in-transit, the node chain(s) 400 is rapidly lowered through the water column, as enabled by the instant invention, to minimize the transit time to the operating depth near the ROV. Once at depth, the vertical descent of the node chain is halted, and the node chain(s) may be further stabilized by heave compensation machinery (not shown) made part of the lifting device 20, by acting to alter the path of the lift line 100 aboard the surface vessel, or other means. The ROV 800 is controlled to approach the suspended node chain 400 from behind (i.e., in the in-transit direction) and activate a robotic arm 820 to release tie down 600 by acting on the release point 612 (similar to 212 in FIG. 5a) of the active affixment device of tie down 600, thereby releasing it from the passive affixment device 220 on node 200-6 (see also FIG. 9), thereby releasing the constraint on the bottom of node chain 400.

Figure 15:
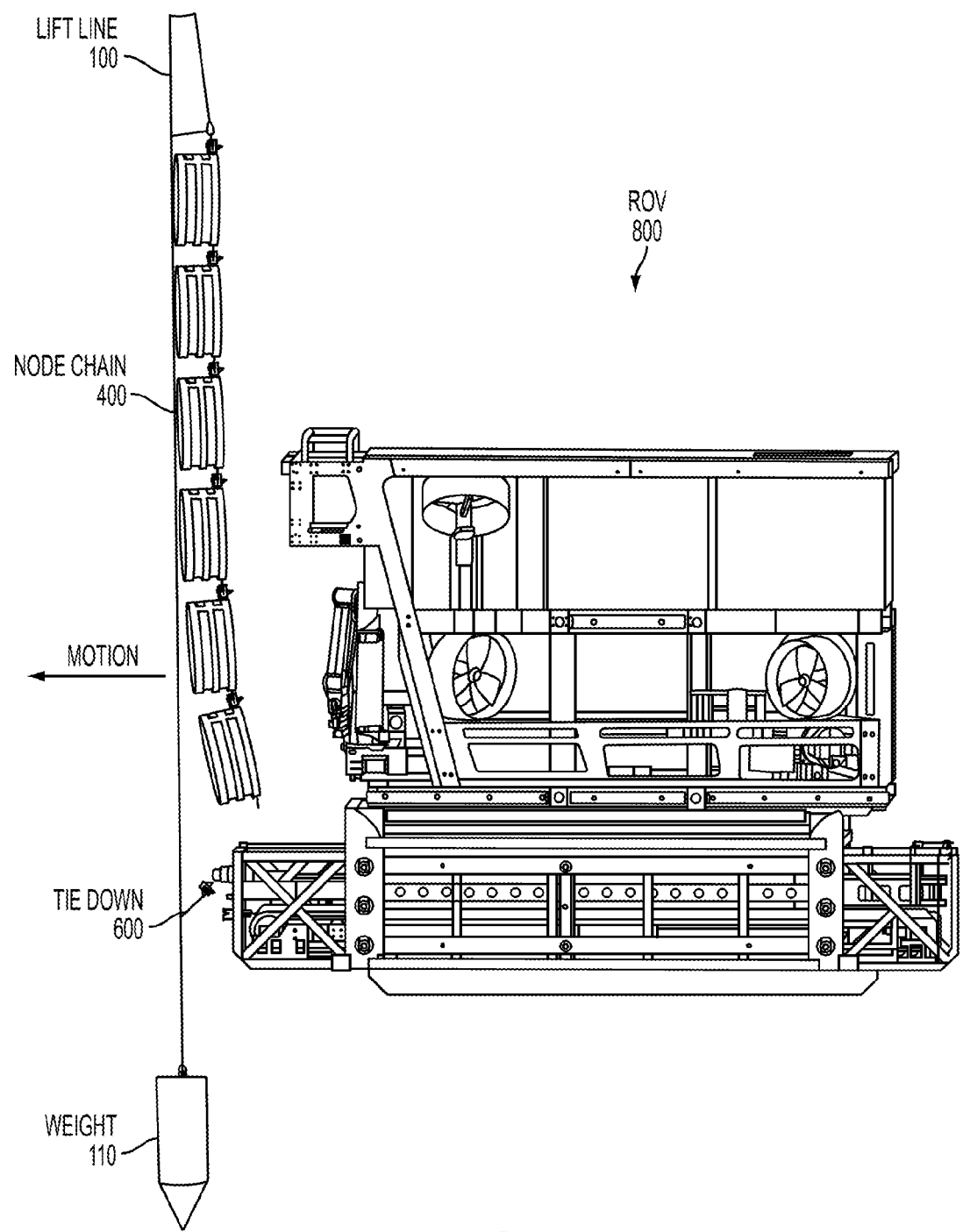

As illustrated in FIG. 15, once released, the tie down 600 will fall away from the node to which it was attached, allowing the node chain 400 to move free from the lift line 100 to which it was held by tie down 600.

Figure 16:
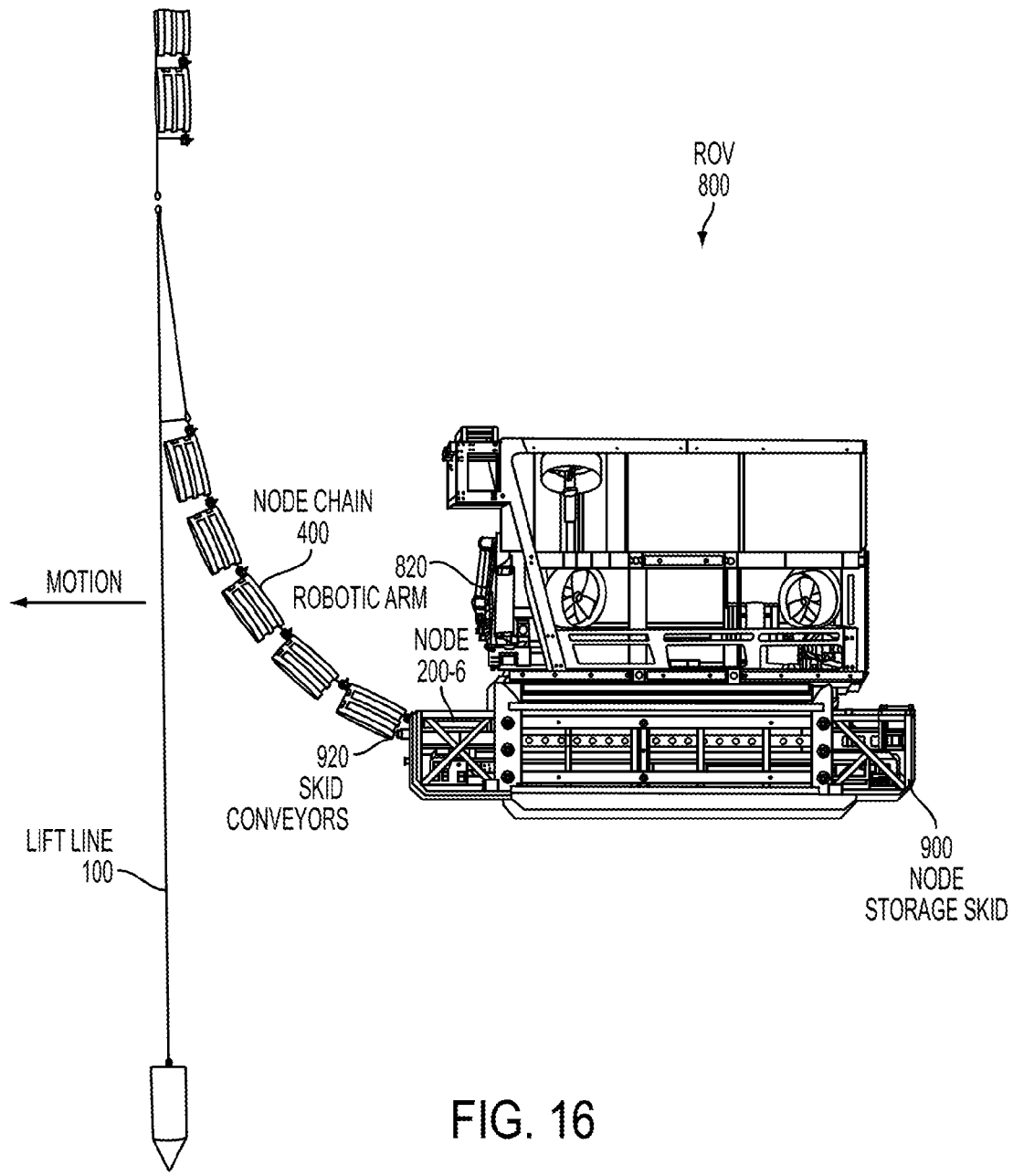
Figure 17:
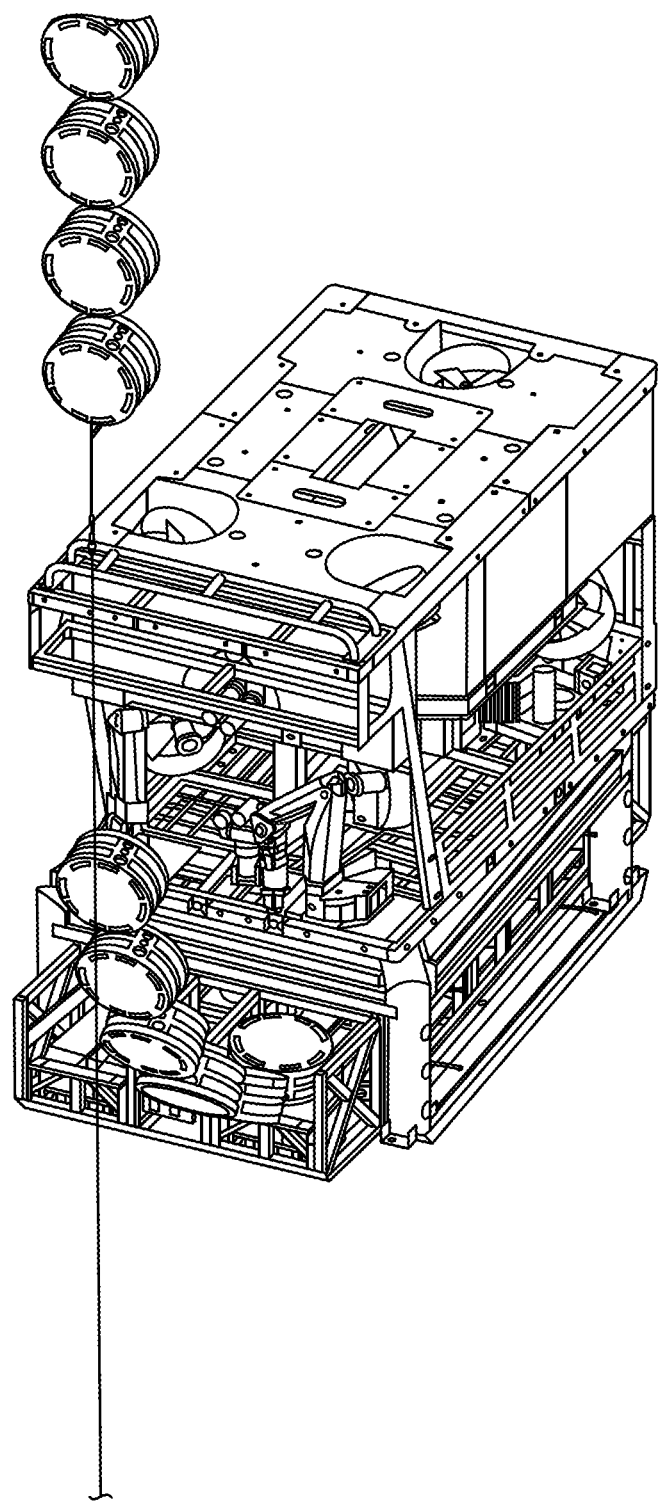
Figure 18:
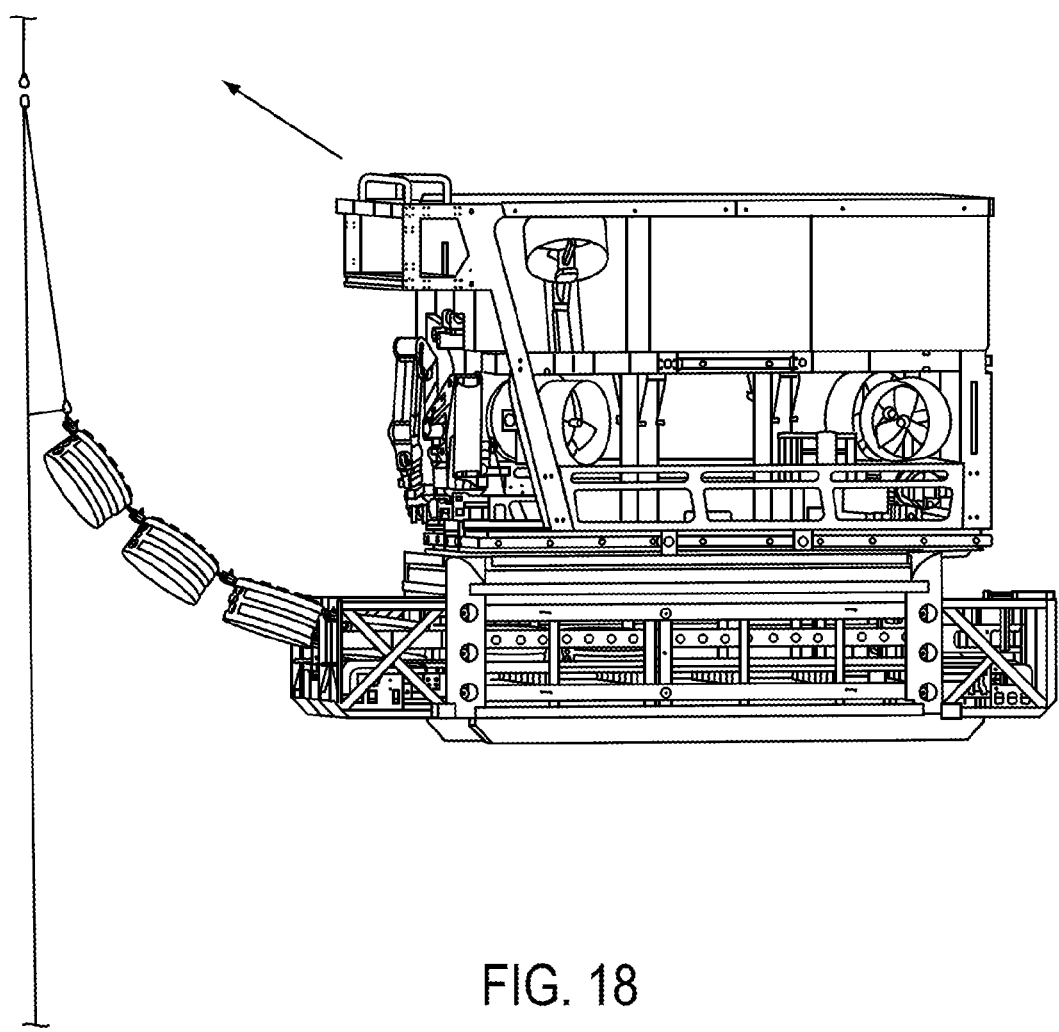

As seen in FIG. 16, the ROV 800 employs its robotic arm 820 to capture and lift node 200-6 (the terminal (leading deployed) node of node chain 400) onto the skid conveyor 920. The conveyor 920 is activated, drawing the node chain 400 into the node storage skid 900. The ROV 800 is controlled to slowly fly upward and forward as the entire node chain is drawn into the node storage skid 900 as illustrated in FIGS. 17-18.

In FIGS. 19(a, b), the ROV 800 employs its robotic arm 820 again to release the active affixment device 210 of node 200-1 by actuating lever 212, leaving the entire node chain 400 free of tag line 300 previously carrying lift from the lift line 100 to node chain 400. Node chain 400 is safely aboard the ROV 800 in the node storage skid 900 and the ROV is free to return to its node deployment work.

One further task is to release the individual nodes 200-1-200-6 that make up node chain 400 from each other in the storage skid so they can be deployed individually on the ocean bottom using the ROV 800 robotic arm 810. FIG. 20 illustrates one of many ways, as those skilled in the mechanical arts will appreciate, to accomplish this. A release apparatus (e.g., spring-loaded catch) 920 is fastened above the node chain 400 in the node storage skid 900. The release apparatus is attached so as to swing out of the way in one direction as nodes are loaded but when nodes are advanced for deployment the release apparatus 920 will be fixed in position and activate the active affixment device 210 by catching the lever arm 212 (see FIG. 5a) on node 200-2, thereby releasing node 200-1 for deployment with the ROV's robotic arm 810 (not shown). This completes the deployment process.

Node recovery begins with ROV 800 recovering a first node 200-6 from the ocean bottom with its robotic arm 810, and placing it in the node storage skid 900 on the skid conveyor 920 following paths similar to those indicated at P1-P3 in FIG. 21. The robotic arm 810 is then used to make a final orientation correction marked P4 such that the active and passive affixment devices 210 and 220 are aligned with the centerline of skid conveyors 920.

FIGS. 22(a-f) illustrate the process of re-creating the node chain 400. In FIG. 22a, skid conveyors 920 are operated aftward as indicated moving the individual node 200-6 towards the interior of the node storage skid 900. In FIG. 22b, the robotic arm 810 places a second node 200-5 at the front of the node storage skid 900, orients it as described herein above, and holds it in place. In FIG. 22c, while the robotic arm 810 holds node 200-5 still, the skid conveyors are advanced in the forward direction to engage the active affixment device 210 of node 200-6 with the passive affixment device 220 of node 200-5. This process is repeated in FIGS. 22(d-f) and continues until the node chain 400 includes the desired number of nodes.

As illustrated in FIG. 23, the ROV 800 is controlled to fly back to a position in close proximity to an unused tag line 300 on the lift line 100, and employs its robotic arm 820 acquire the passive affixment device 310 of tag line 300 and engages it with the active affixment device 210 of node 200-1 of node chain 400. The release apparatus 920 of prior FIG. 20 is withdrawn or removed to prevent the nodes from being released from each other as they were in the deployment process.

As illustrated in FIG. 24, the ROV 800 advances the skid conveyors 920 inside the node storage skid 900 while flying down and away from the lift line 100, leaving the weight of the node string 400 to be carried by the tag line 300.

In FIG. 25, the ROV 800 flies free of the node chain 400 so that the node chain 400 can be recovered to the surface and the ROV 800 can return to recover additional nodes.

As illustrated in FIG. 26, the nodes of the node chain 400 can be affixed one to another by many means. As illustrated throughout, the nodes were connected at the upper perimetal edge of the node, above the plane passing through the node's center of gravity. This causes the node chain 400 to hang in the water column with a natural concave curve through center points of the node covers. This natural curve assures that when the nodes are brought back aboard the vessel by means of ramp 40, and the vessel is in-transit as indicated, they will always come aboard top-up. When back on conveyors 30a and 30b in the node affixment area 700, the node chain 400 may be disassembled and the individual nodes returned to storage where their data can be downloaded and the node batteries recharged.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As may be used herein and in the appended claims for purposes of the present disclosure, the term 'about' means the amount of the specified quantity plus/minus a fractional amount of or reasonable tolerance thereof that a person skilled in the art would recognize as typical and reasonable for that particular quantity or measurement. Likewise, the term 'substantially' means as close to or similar to the specified term being modified as a person skilled in the art would recognize as typical and reasonable as opposed to being intentionally different by design and implementation.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

I claim:

1. A method for deploying and manipulating a payload in an unstable environment, comprising:
   deploying a plurality of unit payloads from a marine surface vessel, wherein the step of deploying a plurality of unit payloads comprises:
      providing, on the marine surface vessel, the plurality of unit payloads each having a non-removable passive affixment device and a non-removable active affixment device diametrically disposed about a perimetal region of each unit payload;
      detachably directly, serially linking at least two of the plurality of unit payloads on the marine surface vessel to form a payload chain by directly coupling the passive affixment device of one of the unit payloads to the active affixment device of another one of the unit payloads;

detachably coupling the payload chain to a lift line that is controllably deployable from the marine surface vessel into/out of a water column; and deploying the lift line and the coupled payload chain into the water column.

2. The method of claim 1, wherein the step of detachably linking at least two of the plurality of unit payloads comprises detachably connecting a passive affixment device of a respective unit payload with an active affixment device of a respective immediately adjacent unit payload.

3. The method of claim 1, wherein the step of providing, on the marine surface vessel, the plurality of unit payloads, further comprises orienting each of the plurality of unit payloads in a manner such that its passive affixment device is in a deployment leading position and its active affixment device is in a deployment trailing position.

4. The method of claim 3, wherein the step of detachably coupling the payload chain to a lift line further comprises detachably coupling a first end of a tag line to a terminal trailing active affixment device wherein a second end of the tag line is fixedly coupled to the lift line.

5. The method of claim 4, further comprising slidably coupling the first end of the tag line to the lift line.

6. The method of claim 4, further comprising slidably, detachably coupling the passive affixment device of a leading unit payload to the lift line.

7. The method of claim 6, further comprising:
capturing the payload chain in the water column,
wherein the step of capturing the payload chain comprises:
providing an ROV including a robotic arm and a payload stowage compartment, in the water column in proximity to a leading end of the deployed payload chain;
de-coupling the passive affixment device of the leading deployed unit payload from the lift line;
starting with the de-coupled leading deployed unit payload, drawing the payload chain into the stowage compartment while controlling the ROV to fly upward and forward; and
upon at least partial capture of the payload chain, de-coupling the terminal, trailing, active affixment device of the payload chain from the first end of the tag line.

8. The method of claim 7, further comprising unlinking the payload chain in the stowage compartment.

9. The method of claim 1, wherein the surface vessel and the deployed payload chain are in-transit.

10. A method for manipulating and recovering a payload from a submerged ROV in an unstable environment to a marine surface vessel, comprising:
providing an ROV including a robotic arm and a payload stowage compartment including a payload chain consisting of a plurality of detachably, directly, serially linked unit payloads each having an active affixment device and a passive affixment device connected thereto;
providing a deployed lift line including a tag line having a passive affixment device attached to a first end thereof and being fixedly coupled at a second end thereof to the deployed lift line from the marine surface vessel;
capturing the passive affixment device attached to the first end of the tag line with the robotic arm and engaging it with the active affixment device disposed on a leading stowed end of the payload chain; and
extracting the payload chain from the stowage compartment of the ROV.

11. The method of claim 10, wherein the step of extracting the payload chain from the stowage compartment of the ROV further comprises controlling the ROV to fly downward and away from the lift line.

12. The method of claim 10, wherein the surface vessel, the deployed lift line, and the ROV are in-transit.

* * * * *